No Printed Specification Available

9378X

S. MORRISON.

Gun-Lock.

Patented Feb. 10, 1836

N. PETERS, PHOTO-LITHOGRAPHER, WASHINGTON, D. C.

Feb. 10. 1836 9378X [illegible]

Samuel Morrison. Northumberland. Pa.

Letters Patent.

The Schedule referred to in these Letters Patent and making ma-
king part of the same containing a description in the words of the said
Samuel Morrison himself of his improvement in the Gun Lock, for
discharging one or two loads from one barrel.

Figure 3:
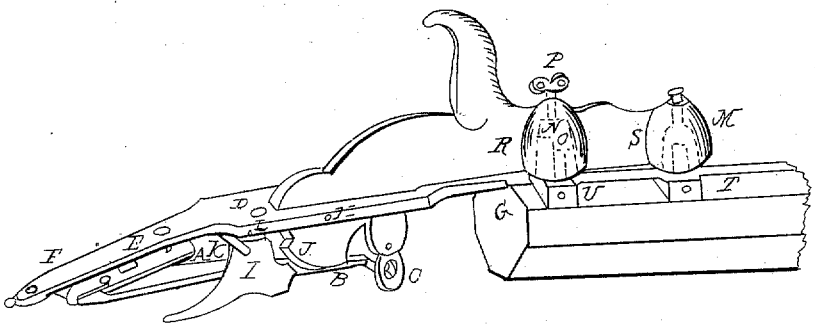

To all to whom these presents shall come: Be it known that
I, Samuel Morrison, of Milton in the County of Northumberland
and State of Pennsylvania have invented a new and useful
improvement in Gun Locks, and in the mode of applying them
so as to discharge either one or two loads from a single barrel
at one and the same time, and that the following is a full and
exact description of the construction and operation of said Machine
as invented or improved by me. The invention or improvement
consists of a lengthened britch-pin (F.G. Figure 3rd) a Lever (fig [illegible])
a dog (fig 3rd) a main spring (A B fig 3rd) a set screw (D fig 3rd) and
Guage screw, E for the purpose of regulating the force of the main spring
and in connecting these in such manner with the britch pin and with
each other, that when the trigger is pulled one or two loads may be
discharged from a single barrel at one time without the necessity of
their being either two barrels or two Locks. — The Britch-pin (F G fig 3rd)
is made about the width of the barrel, and for a common sized
gun extends about five inches along the britch of the gun.
Near the right side of the britch pin a hole ([illegible] fig 3rd) is made for the
admission of the lever which is secured therein by and revolves
upon a pivot ([illegible] fig 3rd) so that when the Lever is raised or
cocked the nose of the dog (I) is pressed into the notch (J) of
the lever by the action of the [illegible] spring, and thus secures the
Lever until by pulling the trigger the nose of the dog is dis-
lodged, and allows the lever to be thrown by the force of the
main

9378X

Figure 1:
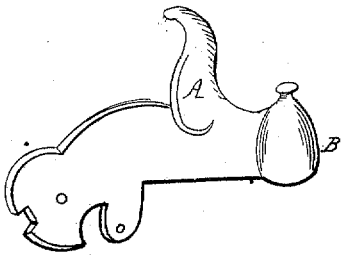
Figure 2:
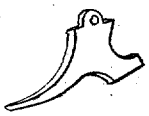
Figure 4:
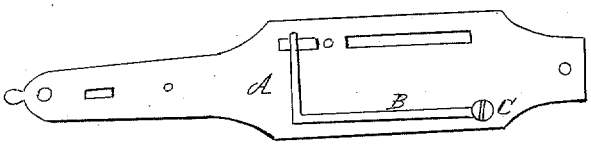
Figure 5:
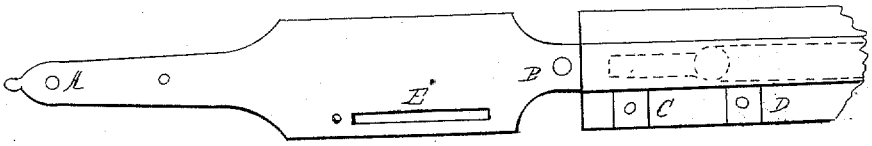

Main-spring (A.B) upon the percussion grain powder or caps
and thus causes the explosion or discharge. The Ferris spring
is fastened by a screw (C fig 4th) upon the underside of the
britch-pin, and in such a manner as to press sufficiently hard
upon the dog (at K fig 3d) to throw its nose into the notch (S) of
the Lever when the latter is raised or cocked. The dog works upon
the underside of the britch-pin upon a pivot L. The set screw
(Q) is for the purpose of regulating the rising of the dog and
thus enables the gunner to shoot either with a light or strong finger
as occasion may require. The mainspring is also secured by
a pivot (R) in the underside of the britchpin, and by turning
the Guage screw G which presses upon it at (H) its force or strength
is increased or diminished at the pleasure of the gunner.
The Britch-pin is let into the Britch of the Gun and secured by
two screws (A & B fig 5th) passing through the same into the [illegible]
of the britch so that when a gun is finished and ready for
use the main spring, Dog and Ferris spring are enclosed within
the britch, and of course nothing belonging to the lock itself
is visible but the upper surface of the britch-pin, the heads of the
set and guage screws and the lever. Upon the upper side of the
Lever there is a projection (I fig 1st) forming part of the same, and
designed as a means of raising or cocking it. And a little in advance
or at the fore part (M) The lever is made in the shape of an inverted
bowl, which falls upon the cap and at the time of its explosion
prevents the fragments from injuring the Gunner. The tube in which
the cap is placed is secured into a shoulder (O on fig 5th) formed upon
the right hand side of the barrel so that it can be removed at pleasure
for the admission of another tube calculated for using the percussion
grain powder. Through the bowl of the lever there is also a hole made
for the introduction of either a screw with a point for the explosion of
of percussion grain powder or one for the explosion of caps, so that
either can be used at the will of the gunner. The invention or improve-
ment further consists in constructing the Lever and a second Tube and and in placing them in such a manner as to shoot off either
one or two loads from a single barrel at one time. A barrel
calculated for these purposes has the diameter of the bore for
the first charge, made smaller than the diameter for the second
and the rest of the above. The length of the bore for the first
charge must be of a size proportionate to that of the gun, and
and the shoulder and the tube T fig 3rd in which the caps or grain
powder is placed for igniting the second charge is placed suffi-
-ciently in advance of the shoulder and tube U. to have its touch
hole opening upon the second charge, a little more than the
diameter of the large bore, from the shoulder which the smaller
one causes at its place of connection with the larger bore.
The two bores as also the place for a bullet belonging to the
first charge is represented by the dotted lines on the barrel of
fig 5th. The lock for a gun calculated for shooting two loads
has two bowls (R & S figure 3rd) the one sufficiently in advance
of the other to suit the relative situation of the tubes. And
in order at any time to shoot off either one or both loads at
a time, one of the bowls is made with a revolving block (N.O)
connecting through the top of the bowls with a thumb piece
(P) so that when placed as represented in the figure both
loads can be discharged at once, but when the block is
turned half round by the thumb piece so that the part N.
takes the place now occupied by the part O and does not
touch the tube, the forward load only is discharged be-
cause when the block is in this last mention situation
the forward bowl is not prevented by the block from stri-
king full upon the forward tube. The revolving block may be put
into either the forward or hindmost bowl of the lock, and the
lock may be made without the moveable screw through the bowls,
if only one kind of priming is to be used. What I claim as my
own invention and not previously known or used in the above
described Machine are First Extending the Breech pin and
Con-

9378X

Converting it into a Lock plate — Second Making the lever upon the principle described, viz, with either one or two bowls with the moveable points or screws — Third, The revolving block, and the mode of fixing it in the bowl which enables the gunner to use either percussion grain powder or caps, and to discharge either one or both loads at a time with but the one lever. Fourth Making the lever to work in and on the britch pin, which prevents any jarring or jerking from the fall of the lever immediately before the explosion — Fifth The set and gauge screws (D.E. fig 3 & 11) as used for the purposes already described — Sixth The shoulder or shoulders formed in barrels, into which the tubes for either percussion grain powder or caps, may be inserted at the will of the gunner.

Samuel Morrison

Witnesses
John Lunger [illegible]
Rich. S. Tharp [illegible]

Drawing

Exd
W.H.

[1554 1083]